Patented July 16, 1940

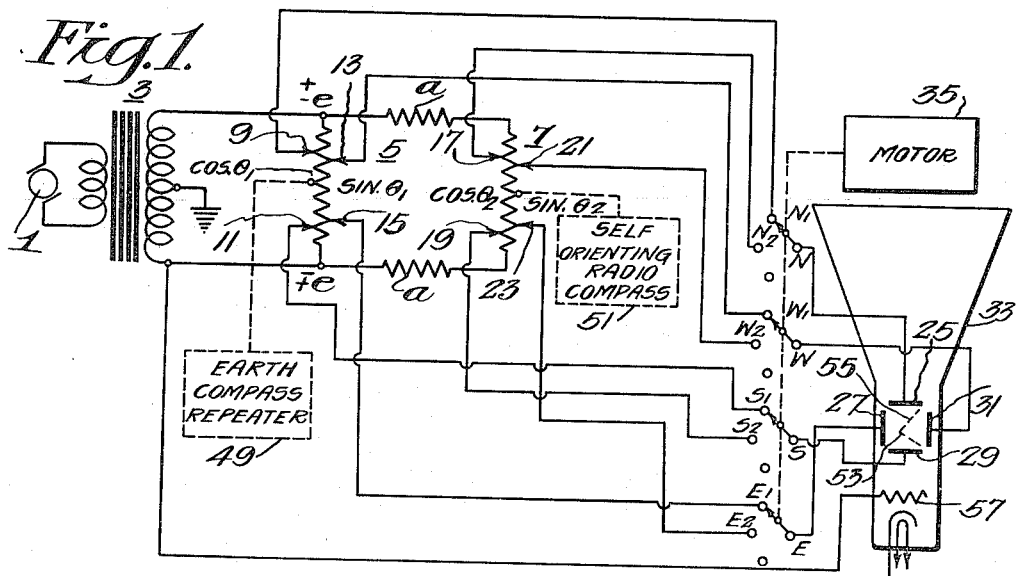

2,208,379

UNITED STATES PATENT OFFICE 2,208,379

RADIO NAVIGATION DEVICE

David G. C. Luck, Oaklyn, N. J., assignor to Radio Corporation of America, a corporation of Delaware Application January 31, 1939, Serial No. 253,891

6 Claims. (Cl. 250—11)

This invention relates to radio navigation devices in which radio and earth compass headings and radio bearings may be indicated on a single device. The invention further relates to a device for automatically indicating position from resultant radio bearings.

In the use of radio compasses on ships and airplanes, the radio compass indicates the heading of the ship with respect to a radio transmitter, and in order to convert the radio heading into a true bearing, it becomes necessary to refer to the earth compass heading. Devices have been proposed in which the earth compass card is associated with the radio compass indicator so that the radio headings may be observed in terms of the ship's earth heading; thus radio bearings with respect to a meridian may be obtained. In such devices it is difficult to use repeaters so that more than one indicator may be located at different positions on the ship and operated by a single earth and radio compass. Furthermore, it is difficult to directly indicate position by observing successively two or more radio bearings.

Among the objects of the present invention is the provision of means for readily indicating on a single instrument radio and earth compass headings as well as the radio bearing. It is a further object to provide means for repeating radio and earth compass headings and radio bearings upon a plurality of cathode ray indicators. It is a still further object to provide means for directly indicating position by the intersection of two or more radio bearings. It is a still further object to provide means for repeating the position of a radio receiver on a plurality of maps operated by a single earth and radio compass device. The invention will be described by referring to the accompanying drawing in which Figures 1 and 2 are schematic wiring diagrams representing one embodiment of the invention; Figure 3 represents a potentiometer from which voltages are derived having a sine wave form; and Figure 4 represents a position indicator of the cathode ray type.

Referring to Fig. 1, a source of alternating current $1$ is impressed by means of transformer $3$ upon a potentiometer $5$ which will hereinafter be described. The terminals of the potentiometer $5$ are connected through resistors $a$—$a$ to a second potentiometer $7$ which is similar to the first-mentioned potentiometer. The first potentiometer includes four contact members $9$, $11$, $13$, $15$. These contact members are connected respectively to the fixed contacts $N_1$, $E_1$, $S_1$, $W_1$ of four three-position switches N, E, S, W. The second potentiometer $7$ includes four contacts $17$, $19$, $21$, $23$. These last-mentioned contacts are connected respectively to the second switch points $N_2$, $E_2$, $S_2$, $W_2$ of the four three-position switches. The four movable contacts of the three-position switches are connected respectively to the deflecting electrodes $25$, $27$, $29$, $31$ of a cathode ray tube $33$. The four three-position switches may be operated in synchronism by a motor $35$.

The construction of the two potentiometers $5$, $7$ is illustrated in Fig. 3. Four circular contact rings $35$, $37$, $39$, $41$ are fixedly arranged in pairs to form two figures of eight. The figures of eight are displaced 90° and arranged in parallel planes. The common portion of each figure of eight is insulated so that each ring forms a separate contact which engages a resistor $43$ which has a uniform resistance per unit length. This resistor is mechanically coupled to a shaft $47$. Suitable slip ring connections or flexible leads at the terminals of the resistor $43$ are connected to the source of alternating current, as previously explained. In the case of the first potentiometer, the shaft $47$ is connected to an earth compass repeater motor $49$ (see Fig. 1). The second potentiometer is constructed similar to the first, but its shaft is coupled to the self-orienting loop of a radio compass $51$. It can be shown that the circular contacts $35$, $37$ of the potentiometers derive potentials which vary, in the case of one figure of eight, as the cosine of the angle between the line through the centers of the circles and the longitudinal axis of the resistor $43$. In the case of the other circular contacts $39$, $41$ the potential varies as the sine of the same angle because of the 90° spacing between the center lines of the contacts.

The operation of the circuit arrangement of Fig. 1 is as follows: When the four switches engage the contacts $N_1$, $E_1$, $S_1$, $W_1$, the first-mentioned potentiometer $5$ is connected to the deflecting plates $25$, $27$, $29$, $31$. The potentials applied to the vertical plates $N_1$, $S_1$ will vary as the cos. $\theta_1$. The horizontal deflecting electrodes are connected to the potentiometer so that the applied potentials vary as sin $\theta_1$. The angle $\theta_1$ is adjusted so that it corresponds to the earth compass heading. Therefore, the applied potentials will deflect the cathode ray to form a trace $53$ which is disposed at an angle corresponding to the earth compass heading.

When the four switches are in the respective positions $N_2$, $E_2$, $S_2$, $W_2$, the first potentiometer $5$ is disconnected and the deflecting electrodes $25$, 27, 29, 31 are connected to the second potentiometer 7. Since this potentiometer is operated by a mechanical connection to the self-orienting loop of a radio compass 51 or a repeater motor connected thereto, the angle $\theta_2$ will vary in correspondence with the radio compass heading. The potentials applied to the vertical deflecting plates $N_2$, $S_2$ will therefore vary as cos. $\theta_2$. In like manner, the potentials applied to the horizontal deflecting plates will vary as sin $\theta_2$. Since the potentials applied to the second potentiometer are less than those applied to the first potentiometer 5 by virtue of the potential drop in the series resistors a—a, the resulting cathode ray trace 55 will have a shorter length and may thereby be identified. In order that 180° ambiguity may be avoided, it is preferable to connect the control grid 57 of the cathode ray tube so that it derives a biasing potential from the source 1. If the switch contacts are operated at a fairly high rate, 20 times per second, by way of example, the cathode ray traces 53, 55 will appear persistent and thereby the device will simultaneously indicate the earth compass heading and the radio compass heading.

In order that the earth and radio compass headings may be combined and the resulting radio bearings be indicated, it is necessary to apply deflecting potentials cos $(\theta_1+\theta_2-180°)$ and sin $(\theta_1+\theta_2-180°)$. The solutions of these trigonometric functions are as follows:

$$\sin (\theta_1+\theta_2-180°) = -\sin \theta_1 \cos \theta_2 - \cos \theta_1 \sin \theta_2$$
$$\cos (\theta_1+\theta_2-180°) = -\cos \theta_1 \cos \theta_2 + \sin \theta_1 \sin \theta_2$$

Potentials corresponding to these functions may be derived by connecting contacts 9 and 11 through series resistors b—b to a third potentiometer 59 and contacts 13, 15 through series resistors b'—b' to a fourth potentiometer 64. The last-mentioned potentiometers 59, 64 include circular contacts 63, 67 and 69, 71. These contacts are connected respectively to the four contacts $N_3$, $W_3$, $E_3$, $S_3$ of the three-position switches N, E, S, W. It may now be explained that in actual practice the circuits illustrated in Figs. 1 and 2 are combined. In this application, to avoid confusion the circuits have been separated and thus simplified. The connections of potentiometers 5 and 7 which are shown in Fig. 1 are omitted in Fig. 2. The resistors, which form the third and fourth potentiometers 59 and 64 respectively, are constructed as previously described by reference to Fig. 3. The resistors 7, 59 and 64 are ganged and operated by a connection to the self-orienting radio compass. The function of the series resistors b—b and b'—b' is to reduce the applied potentials so that the cathode ray trace 73 is made shorter than the traces corresponding to the earth compass and radio compass headings.

The operation of the system described is essentially similar to the operation of the circuit arrangement of Fig. 1 with the exceptions: that the potentials of contact 63 is represented by the function $-\cos \theta_1 \cos \theta_2$; the contact 67 by the function $+\cos \theta_1 \sin \theta_2$; the contact 69 by the function $-\sin \theta_1 \cos \theta_2$; and the fourth contact 71 by the function $-\sin \theta_1 \sin \theta_2$. Thus, it will be seen that these functions correspond with the terms of the equations set forth above, except that the potentials applied to the south and west deflecting plates are reversed in sign because these plates produce deflections directed oppositely from those produced by the north and east plates. It may be seen that the potentials applied to the third potentiometer 59 vary as cos $\theta_1$ while the potentials across the fourth potentiometer 64 vary as sin $\theta_1$. Since the positions of the resistors of the third and fourth potentiometers 59 and 64 as sin $\theta_2$, and since the contacts are arranged so that the proportions of output to input potentials vary as cos $\theta_2$ and sin $\theta_2$, it follows that the potentials applied to the three-point switches will vary so as to represent the algebraic product of the potentials corresponding to the earth heading and radio compass heading to thereby indicate the radio bearing. Of course, the resistances 59 and 64 must be made very much greater than the resistance 9 for this to be accurately true.

In accordance with well known principles of navigation, positions may be fixed by the intersection of bearings of the mobile craft from two fixed points. The present system lends itself readily to position fixing by employing a pair of cathode ray tubes which may be arranged to simultaneously indicate a pair of radio bearings which, when plotted on a map, give rise to an intersection which indicates position. In some installations, it may be desirable to directly indicate such intersections by employing either double sets of electrodes within a single cathode ray tube or by employing D. C. biasing potentials as proposed by Vladimir K. Zworykin in his copending application, Serial No. 165,454, filed September 24, 1937, entitled "Radio course indicator." In either type of installation the resultant indications are shown in Fig. 4 in which the intersection of the straight lines represents the position of the receiving device with respect to a map of the adjacent territory.

Thus, the invention has been described as a radio navigation instrument in which earth compass and radio compass headings are indicated by the cathode ray trace of a cathode ray tube. These indications are obtained by the use of a novel arrangement of potentiometers. The radio bearings resulting from the algebraic combinations of the earth and radio compass headings are obtained by similar potentiometer arrangements whereby the radio bearings are directly indicated on the same tube as is used for indicating the headings. It should be understood that errors in the earth or radio compasses may be compensated by interposing suitable cams between the compasses or compass repeaters and potentiometers or by suitable modifications of the potentiometer resistance per unit length. In place of the resistances and circular contacts, a light beam may be projected through a slit or slits on one or more photoelectric tubes and the light beam varied by interposing pairs of circular shutters between the light beam and the slit. The algebraic products may be produced by successive control of the same light beam by two shutters. It will be seen that the system lends itself to indicating at a plurality of points by connecting several cathode ray tubes in parallel. It should be understood that electronic switching may be substituted for the motor driven switch. If direct map indication of bearing lines is not required, a direct current source may be used and the control electrode connection omitted; the indications will then be three single light spots, moving on concentric circles of different radii, and will be brighter than the radial lines obtained with alternating current operation.

I claim as my invention:

1. In a radio navigation device, a cathode ray tube including deflecting electrodes, an earth compass, a radio compass, a source of current, means coupled to said earth compass and to said source for deriving first deflecting potentials dependent upon said earth compass heading, means coupled to said radio compass and to said source for deriving second deflecting potentials dependent upon said radio compass heading, means for applying said first and then said second deflecting potentials to said deflecting electrodes, an electrical network, means for applying said first deflecting potential to said electrical network to establish a second source of current which varies as a function of said earth compass heading, means coupled to said radio compass and said second source for deriving third deflecting potentials dependent upon the algebraic sum of said earth and radio headings, and means for applying said third deflecting potentials to said deflecting electrodes.

2. In a radio navigation device, a cathode ray tube including a beam intensity control electrode and deflecting electrodes, an earth compass, a radio compass, a source of current, means coupled to said earth compass and to said source for deriving first deflecting potentials dependent upon said earth compass heading, means coupled to said radio compass and to said source for deriving second deflecting potentials dependent upon said radio compass heading, means for applying said first and then said second deflecting potentials to said deflecting electrodes, an electrical network, means for applying said first deflecting potential to said electrical network to establish a second source of current which varies as a function of said earth compass heading, means coupled to said radio compass and said second source for deriving third deflecting potentials dependent upon the algebraic sum of said earth and radio headings, means for applying said third deflecting potentials to said deflecting electrodes and a connection from said control electrode to said first-mentioned source.

3. In a radio navigation device, a cathode ray tube including deflecting electrodes, an earth compass, a radio compass, a source of alternating current, means coupled to said earth compass and to said source for deriving first deflecting potentials dependent upon said earth compass heading, means coupled to said radio compass and to said source for deriving second deflecting potentials dependent upon said radio compass heading, means for applying said first and then said second deflecting potentials to said deflecting electrodes, an electrical network, means for applying said first deflecting potentials to said electrical network to establish a second source of alternating current which varies as a function of said earth compass heading, means coupled to said radio compass and said second source for deriving third deflecting potentials dependent upon the algebraic sum of said earth and radio headings, and means for applying said third deflecting potentials to said deflecting electrodes.

4. In a radio navigation device, a cathode ray tube including deflecting electrodes, an earth compass, a radio compass, a source of current, means coupled to said earth compass and to said source for deriving first deflecting potentials dependent upon said earth compass heading, means coupled to said radio compass and to said source for deriving second deflecting potentials dependent upon said radio compass heading, means for making said second deflecting potentials assume a scale of values different from said first deflecting potentials, means for applying said first and then said second deflecting potentials to said deflecting electrodes, a resistive network, means for applying said first deflecting potentials to said resistive network to establish a second source of current which varies as a function of said earth compass heading, means coupled to said radio compass and said second source for deriving third deflecting potentials dependent upon the algebraic sum of said earth and radio headings, means for making said third deflecting potentials assume a scale of values different from said first and second deflecting potentials, and means for applying said third deflecting potentials to said deflecting electrodes.

5. In a radio navigation device, a cathode ray tube including deflecting electrodes, an earth compass, a radio compass, a source of alternating current, means coupled to said earth compass and to said source for deriving first deflecting potentials dependent upon said earth compass heading, means coupled to said radio compass and to said source for deriving second deflecting potentials dependent upon said radio compass heading, means for making said second deflecting potentials assume a scale of values different from said first deflecting potentials, means for applying said first and then said second deflecting potentials to said deflecting electrodes, a resistive network means for applying said first deflecting potential to said resistive network to establish a second source of alternating current which varies as a function of said earth compass heading, means coupled to said radio compass and said second source for deriving third deflecting potentials dependent upon the algebraic sum of said earth and radio headings, means for making said third deflecting potentials assume a scale of values different from said first and second deflecting potentials, and means for applying said third deflecting potentials to said deflecting electrodes.

6. In a radio navigation device, a cathode ray tube including a beam intensity control electrode and deflecting electrodes, an earth compass, a radio compass, a source of alternating current, means coupled to said earth compass and to said source for deriving first deflecting potentials dependent upon said earth compass heading, means coupled to said radio compass and to said source for deriving second deflecting potentials dependent upon said radio compass heading, means for making said second deflecting potentials assume a scale of values different from said first deflecting potentials, means for applying said first and then said second deflecting potentials to said deflecting electrodes, potentiometer means, means for applying said first deflecting potential to said potentiometer means to establish a second source of alternating current which varies as a function of said earth compass heading, means coupled to said radio compass and said second source for deriving third deflecting potentials dependent upon the algebraic sum of said earth and radio headings, means for making said third deflecting potentials assume a scale of values different from said first and second deflecting potentials, means for applying said third deflecting potentials to said deflecting electrodes, and a connection from said control electrode to said first-mentioned source.

DAVID G. C. LUCK.